(12) United States Patent
Lepers et al.

(10) Patent No.: US 8,530,618 B2
(45) Date of Patent: Sep. 10, 2013

(54) PROCESS FOR RECOVERING A POLYMER FROM A SOLUTION

(75) Inventors: Jean-Christophe Lepers, Ottignies (BE); Denis Geets, Kraainem (BE); Jean-Raphael Caille, Namur (BE)

(73) Assignee: Solvay, Brussels (BE)

( * ) Notice: Subject to any disclaimer, the term of this patent is extended or adjusted under 35 U.S.C. 154(b) by 214 days.

(21) Appl. No.: 12/677,906

(22) PCT Filed: Sep. 18, 2008

(86) PCT No.: PCT/EP2008/062447
§ 371 (c)(1),
(2), (4) Date: Mar. 12, 2010

(87) PCT Pub. No.: WO2009/037316
PCT Pub. Date: Mar. 26, 2009

(65) Prior Publication Data
US 2010/0305223 A1      Dec. 2, 2010

(30) Foreign Application Priority Data

Sep. 21, 2007 (FR) ..................................... 07 57769

(51) Int. Cl.
*C08F 6/00* (2006.01)
(52) U.S. Cl.
USPC ........... 528/500; 528/480; 528/491; 528/499; 528/502 R; 528/502 F; 528/503; 521/45; 521/46.5; 210/705
(58) Field of Classification Search
USPC .................... 521/40, 40.5, 41, 42.5, 44, 44.5, 521/45, 45.5, 46, 46.5, 47, 48.5; 528/480, 528/481, 489, 491, 495, 499, 500, 501, 502 R, 528/502 A, 502 D, 502 E, 503
See application file for complete search history.

(56) References Cited

U.S. PATENT DOCUMENTS 4,071,479 A * 1/1978 Broyde et al. ............... 521/46.5
4,146,499 A * 3/1979 Rosano ..................... 252/186.32

(Continued)

FOREIGN PATENT DOCUMENTS

WO   WO 01/70865 A1   9/2001
WO   WO 03/054064 A1  7/2003

(Continued)

OTHER PUBLICATIONS

U.S. Appl. No. 12/063,710, filed Feb. 13, 2008, Fassiau et al, Not yet published.
Van Krevelen D.W. "Solubility" in "Properties of Polymers", Third edition, 1990, p. 200-202, Elsevier, Amsterdam, Oxford, New York, Tokyo; 4 pgs.
Burrell H., "Solubility Parameters Values" in "Polymer Handbook", Bandrup J. and Immergut E.H. Editors, Second Edition, 1975, p. IV-337 to IV-359, Wiley-Interscience Publication, Wiley & Sons, New York, London, Sydney, Toronto; 25 pgs.

*Primary Examiner* — Frances Tischler
(74) *Attorney, Agent, or Firm* — Oblon, Spivak, McClelland, Maier & Neustadt, L.L.P.

(57) ABSTRACT

Process for recovering a polymer by injection of steam, and optionally liquid water, into a solution of this polymer comprising a polar aprotic organic solvent (PAOS) that has an azeotrope with water and an apolar organic compound that is miscible with the PAOS and immiscible with water and that acts as a phase separation agent (PSA), the boiling point of which is below that of the water/PAOS azeotrope, the amount of steam injected being sufficient to give rise to the substantial removal of the PSA via stripping and that of the PAOS via azeotropic distillation, and the total amount of water being sufficient to give rise to the precipitation of the polymer, this process being characterized in that the polymer solution also comprises an alcohol, at least during the precipitation of the polymer.

16 Claims, 4 Drawing Sheets

Particle size FC001

(56) References Cited

U.S. PATENT DOCUMENTS

| | | | |
|---|---|---|---|
| 6,172,125 | B1 | 1/2001 | Vandenhende et al. |
| 6,989,404 | B2 | 1/2006 | Yamamoto et al. |
| 7,135,546 | B1 | 11/2006 | Vandenhende et al. |
| 7,569,658 | B2 * | 8/2009 | Vandenhende et al. ....... 528/491 |
| 2003/0119925 | A1 | 6/2003 | Vandenhende et al. |
| 2005/0010027 | A1 | 1/2005 | Vandenhende et al. |
| 2005/0077640 | A1 | 4/2005 | Fassiau et al. |
| 2006/0173085 | A1 | 8/2006 | Fassiau |
| 2006/0173086 | A1 | 8/2006 | Fassaiau |
| 2006/0194913 | A1 | 8/2006 | Pleska et al. |
| 2006/0223896 | A1 | 10/2006 | Lepers et al. |
| 2008/0047671 | A1 | 2/2008 | Vandenhende |
| 2009/0124715 | A1 | 5/2009 | Vandenhende |
| 2009/0149619 | A1 | 6/2009 | Fassiau et al. |
| 2009/0203868 | A1 | 8/2009 | Fassiau et al. |

FOREIGN PATENT DOCUMENTS

| | | |
|---|---|---|
| WO | WO 03/064504 A1 | 8/2003 |
| WO | WO 2004/081088 A1 | 9/2004 |
| WO | WO 2004/081093 A1 | 9/2004 |
| WO | WO 2005/014705 A1 | 2/2005 |
| WO | WO 2005/017010 A1 | 2/2005 |
| WO | WO 2005/100411 A1 | 10/2005 |
| WO | WO 2005/100461 A1 | 10/2005 |
| WO | WO 2006/030020 A1 | 3/2006 |
| WO | WO 2006/051116 A1 | 5/2006 |
| WO | WO 2006/053907 A1 | 5/2006 |
| WO | WO 2006/069856 A1 | 7/2006 |
| WO | WO 2007/020280 A1 | 2/2007 |
| WO | WO 2009/135891 A1 | 11/2009 |

* cited by examiner

PROCESS FOR RECOVERING A POLYMER FROM A SOLUTION

CROSS-REFERENCE TO RELATED APPLICATIONS

This application is a U.S. national stage application under 35 U.S.C. §371 of International Application No. PCT/EP2008/062447 filed Sep. 18, 2008, which claims priority to French Patent Application No. 0757769 filed Sep. 21, 2007, these applications being incorporated herein by reference in their entirety for all purposes.

The present invention relates to a process for recovering a polymer from a solution containing it and also to a recycling process that involves such a process.

Polymers are extensively used in a variety of forms, mainly in the solid state. However, sometimes, at one stage or other of their existence they are present in a liquid medium, usually in the form of a solution in a solvent, from which it is then necessary to extract them. Thus, polymer solutions are encountered at the end of certain polymerization processes (known as solution polymerization processes), in the course of certain recycling processes and during the cleaning of certain installations for manufacturing polymer-based articles or paints. The recovery of the polymer in the solid state, starting from a solution, generally involves at least one solvent evaporation step.

Thus, Application WO 01/70865 in the name of the Applicant describes a method of recycling a polymer according to which the polymer is brought into contact with a solvent that is capable of dissolving it and that has an azeotrope with water so as to be able to be stripped from the precipitation medium via azeotropic distillation by injecting steam into said medium.

In the process of WO '865, a phase separation agent (PSA) is also present when the polymer is brought into contact with the solvent and it has the effect of improving the dissolution of the polymer by the solvent. Preferably, the solvent is a polar organic solvent, more particularly a ketone, and the PSA is an aliphatic hydrocarbon having 5 to 7 carbon atoms.

The invention that is the subject of WO '865 is based on the surprising observation that the addition of certain phase separation agents to the polymer solvent/polymer non-solvent mixture makes it possible not only to facilitate the settling of this mixture (which is particularly useful in the context of a loop recycling process, where the solvent and the non-solvent are recycled either continuously or from one batch to the next), but also to increase the dissolving power of the solvent-rich phase with respect to the polymer in question. Consequently, the process becomes more flexible, less energy-consuming and less expensive.

However, Application WO 05/100461, also in the name of the Applicant, recommends removing substantially all the PSA before the complete precipitation of the polymer. This is because this PSA seems to have an agglomerating effect on the polymer particles. Therefore, preferably, either the PSA has a boiling point below that of the water/solvent azeotrope, or it has an azeotrope with water that has a boiling point below that of the water/solvent azeotrope so that it can be completely stripped from the liquid medium before the precipitation of the polymer. The fact of having to completely strip the PSA is crippling from an economic viewpoint since it consumes a lot of steam.

Moreover, still with a view to preventing the agglomeration of polymer grains (and therefore, to being able to work with more concentrated solutions), Application WO 05/017010, also in the name of the Applicant, recommends the use of two different suspending agents that have different affinities with respect to the solvent and the non-solvent and that are introduced at different moments of the process. However, these dispersants are expensive.

Lastly, the aforementioned applications recommend carrying out the precipitation under vacuum also with a view to overcoming the agglomeration and therefore improving the particle size. This is penalizing from the point of view of the equipment and safety of the process.

Therefore, in summary: to prevent the polymer particles from agglomerating, the Applicant believed to date that it was necessary to simultaneously strip all the PSA, use costly suspending agents and precipitate under vacuum.

However, the Applicant has since found that the presence of an alcohol in the precipitation medium was able to overcome the phenomenon of grain agglomeration induced by the presence of the PSA, even to the point of being able to work without the aforementioned cautions (conditions).

Moreover, since many alcohols have an azeotrope with water, the current equipment and processes of the Applicant (based on the removal of organics via azeotropic distillation) can be used without additional investments on condition that an alcohol is chosen for which the azeotrope with water has a higher boiling point than that of the water/solvent azeotrope (since the alcohol must be present during the precipitation of the polymer, which takes place by azeotropic distillation of the solvent).

The present invention therefore relates to a process for recovering a polymer by injection of steam, and optionally liquid water, into a solution of this polymer comprising a polar aprotic organic solvent (PAOS) that has an azeotrope with water and an apolar organic compound that is miscible with the PAOS and immiscible with water and that acts as a phase separation agent (PSA), the boiling point of which is below that of the water/PAOS azeotrope, the amount of steam injected being sufficient to give rise to the substantial removal of the PSA via stripping and that of the PAOS via azeotropic distillation, and the total amount of water being sufficient to give rise to the precipitation of the polymer, this process being characterized in that the polymer solution also comprises an alcohol, at least during the precipitation of the polymer.

Preferably, for the reasons explained above, this is an alcohol that has an azeotrope with water, the boiling point of which is higher than that of the water/PAOS azeotrope. Most particularly preferably, the water/alcohol azeotrope has a boiling point below the boiling point of water so as to be able to drive the azeotropic distillation of the medium until substantially all the organic liquids are removed therefrom and until only polymer particles in water remain.

The polymer for which the recovery is targeted by the process according to the present invention may be of any nature. It may be a thermoplastic resin or an elastomer, but in any case a resin that can be dissolved in a solvent and that is therefore uncrosslinked or lightly crosslinked. It may be an unused (or virgin) resin, which has not undergone any shaping by melting except a possible granulation, or a used resin (production scrap or recycled resin). It may be apolar polymers, such as the polymers of ethylene (PE) or of propylene (PP). It may be polar polymers such as the polymers derived from styrene monomers, acrylic monomers and halogenated ethylenically unsaturated monomers or else copolymers of ethylene and vinyl alcohol (EVOH) or vinyl acetate (EVA, EBA, etc.). It may also be thermoplastic polymers resulting from condensation reactions such as the polycarbonates obtained by reaction of bisphenol A and phosgene, for example. It may also be polyamides.

Among all the polymers and polymer blends mentioned above, good results have been obtained with polymers derived from vinyl chloride—either homopolymers (PVC), or copolymers (with vinyl acetate for example, or VC/VAc copolymers) but that preferably have at least 50% by weight of vinyl chloride; or with polymers that have a solubility parameter close to that of PVC (such as PMMA (polymethyl methacrylate), PVA (polyvinyl alcohol) and PUR (polyurethane)). The term "close" is understood to define solubility parameters (expressed in $MPa^{1/2}$) that do not generally differ from one another by more than around 1.8. The following may also be suitable: polymers such as polycarbonates (PCs), polyesters, polyamides, ABS (acrylonitrile/butadiene/styrene terpolymers), SAN (styrene/acrylonitrile copolymers), SMA (styrene-co-maleic anhydride copolymers), TPUR (thermoplastic polyurethanes) and amorphous polyesters.

The process according to the present invention also applies to the aforementioned blends of polymers, whether they are of the same nature or of different natures.

The polymer may be in any form. It may be polymerization, compounding or processing scrap, possibly in the liquid or pasty state, possibly even in solution in a solvent. It may also be solid articles comprising one or more customary additives such as, for example, plasticizers, stabilizers, antioxidants, flame retardants, pigments, fillers, etc., including reinforcing fibres. These fibres may be of any nature, natural or synthetic; it is also possible to use glass fibres, cellulose fibres or plastic fibres. They are usually plastic fibres, in particular polyester fibres.

The process according to the present invention applies to the recovery of any polymer in solution, i.e. dissolved in a liquid medium containing a solvent of said polymer which is a polar aprotic organic solvent. According to the invention, this solvent, in which the polymer is at least partially soluble and usually completely soluble, is generally a liquid that has a solubility parameter (a definition of which and experimental values appear in "Properties of Polymers", D. W. Van Krevelen, 1990 Edition, pp. 200-202, and also in "Polymer Handbook", J. Brandrup and E. H. Immergut, Editors, Second Edition, p. IV-337 to IV-359) close to the solubility parameter of the polymer. The term "close" is understood to define solubility parameters of the polymer and of the solvent (expressed in $MPa^{1/2}$) that do not generally differ from one another by more than around 1.8.

According to the invention, this solvent is aprotic (i.e. devoid of hydrogen atoms that are capable of creating hydrogen bonds, as opposed to alcohols, for example) and polar (i.e. having a non-zero dipole moment).

This may be DMSO (dimethyl sulphoxide), THF (tetrahydrofuran) or ketones. Ketones, and in particular, MEK (methyl ethyl ketone) or DEK (diethyl ketone), give good results with many polymers and in particular with the aforementioned polymers (PVC or polymers that have a solubility parameter close to that of PVC). The term "solvent" is understood to mean both single substances and mixtures of substances.

According to the invention, the polymer solution also comprises a PSA, the role of which is explained above and which is an apolar organic compound that is miscible with the PAOS and immiscible with water. This is preferably an aliphatic hydrocarbon having 5 to 7 carbon atoms. In particular with MEK or DEK as solvent, excellent results have been obtained by choosing n-hexane or isohexane (2-methylpentane) as a phase separation agent. The latter is particularly suitable considering that its boiling point is not very high (60° C. at atmospheric pressure compared to 69° C. for n-hexane).

Lastly, the polymer solution comprises, at least during the precipitation of the polymer (and preferably before any water is injected), an alcohol, and preferably an alcohol that has an azeotrope with water, the boiling point of which is above that of the water/PAOS azeotrope. Most of the linear aliphatic alcohols apart from methanol are suitable from this perspective. In particular, C2-C6 linear aliphatic alcohols are especially suitable, and most particularly C3-C5 linear aliphatic alcohols. Alcohols with a higher number of Cs in fact risk not being easily removed during the final stripping and remaining trapped in the PVC grains recovered.

Similarly, so as not to have to evaporate too much water, it is preferable for the water/alcohol azeotrope to have a low water content. Isopropanol and tert-butyl alcohol (2-methyl-2-propanol) are therefore particularly suitable (their azeotropes with water containing around 12% by weight of water).

The liquid medium in which the polymer is dissolved may also contain—besides the PAOS and the PSA—other organic or inorganic compounds. In particular, in the case of a recycling process operating in a closed loop (which will be explained later on), the solvent may be a recycled liquid stream and may contain a certain amount of non-solvent (water).

When the polymer is PVC, good results have been obtained when the dissolving liquid medium (I) contains between 2% and 8% by weight of alcohol (and most particularly preferably between 3% and 4.5% by weight of alcohol (preferably isopropanol)), between 13% and 17% of PSA (preferably isohexane) and between 4% and 6% of water, the remainder (namely between 69% and 79% by weight) being composed of PAOS (preferably MEK). The fact of having around 15% of PSA in the medium allows effective settling and dissolving of many types of PVC scrap (even containing water) and it is preferable not to exceed 8% alcohol to avoid greatly reducing the bulk density (BD) of the PVC particles but also to avoid diminishing the separating ability of the PSA.

The concentration, in the liquid medium, of the polymer to be recovered may vary widely. In general, the amount of polymer represents more than 5% by weight relative to the total weight of the liquid medium, preferably more than 10% by weight, most particularly more than 15% by weight. This amount of dissolved polymer does not generally exceed 60% by weight of the total weight of solution, preferably does not exceed 40% by weight and most particularly does not exceed 35% by weight or even 25% (see later on). Too low a polymer concentration leads to a high energy expenditure for removal of the solvent. Too high a polymer concentration impairs the fluidity of the solution and the handling thereof.

According to the invention, steam is injected into the liquid medium in a sufficient amount to give rise to the substantial removal of the PSA via stripping (evaporation) and of the PAOS (or even of the alcohol) via azeotropic distillation.

According to one particularly advantageous variant of the invention, subject of Application WO 05/014705 in the name of the Applicant, liquid water is also added to the medium in order to approach phase inversion (i.e. the change from a medium made up of a continuous organic phase in which an aqueous phase is dispersed, to a medium in which the organic phase is dispersed in the (continuous) aqueous phase), but without achieving it. This variant is advantageous from an economic viewpoint since it consumes less steam. This liquid water does not necessarily have to be pure: it may contain solvent and alcohol, and more specifically: consist of an aqueous phase recovered from a similar process that has taken place beforehand or in parallel (see later on). For the same reason, liquid water and/or aqueous phase may be added in addition to steam to help to produce the aforementioned phase inversion.

Generally, within the context of the invention, the polymer solution consists of an organic phase in which an aqueous phase is optionally dispersed. In one particularly advantageous variant of the invention, a liquid aqueous phase is added to this organic phase in order to approach its phase inversion without going beyond it and then steam is injected so that at least some of the PSA is removed from the solution before phase inversion. This is because the amount of PSA required in the starting solution so that it is effective both in helping to dissolve the polymer and in a possible settling of the aqueous and organic phases (which is around 15% in the case of PVC: see above), is generally too high for the alcohol to make the organic phase sufficiently hydrophilic during the phase inversion that gives rise to the definitive precipitation of the polymer.

In a first variant, the PSA is substantially removed (i.e. reduced to a concentration below the weight %) from the liquid medium before the precipitation of the polymer (i.e. before phase inversion), by injecting steam. In this variant, it is possible to work at a relatively high polymer concentration in the solution (e.g. up to 35% by weight of PVC with the medium (I) described above) on condition that the composition of the medium is adjusted by adding liquid or vapour of azeotropic composition thereto, as described in Application WO 05/100461 in the name of the Applicant.

In this variant, in the course of removing the PSA, pre-precipitation of the polymer (i.e. the formation of small grains of polymer that have a diameter of the order of μm and that are dispersed in the organic phase) is generally observed, the actual precipitation (to form particles of agglomerated grains having a diameter of the order of 100's of μm) preferably taking place by injection of steam and of additional liquid water to achieve and go beyond phase inversion, preferably with adequate stirring. This stirring can be provided by any known device, for example by a mechanical stirrer, by injection of a gas, etc. Preferably, this may be intense mechanical stirring, for example using a mechanical stirrer. A stirrer with a rotor rotating at least 500 rpm (or even several thousands of rpm) gives good results.

In the other variant (i.e. when the PSA is not substantially removed and when at least a few % remain in the liquid medium during the phase inversion), 2 sub-variants can be distinguished:
  either steam is injected while adjusting the composition of the medium with liquid or vapour of azeotropic composition as explained above and a large fraction (at least half) of the PSA is evaporated before giving rise to the phase inversion; in this case it is also possible to work with a relatively high polymer concentration in the solution (e.g. up to 35% by weight of PVC with the medium (I) described above).
  or pure steam is injected (which also has the effect of partially removing the PSA) but without adjusting the composition of the medium and in this case it is better the limit the polymer concentration of the solution (e.g. to 25% by weight of PVC with the medium (I)).

This $2^{nd}$ sub-variant (with partial removal of the PSA) however has the advantage that it is no longer necessary to vaporize a large amount of azeotrope, which in fact makes it equivalent to the other variant from an energy saving point of view. In this sub-variant, the pre-precipitation of the polymer is caused by injection of steam, which also has the effect of reducing the PSA content of the medium. Most particularly preferably, the amount of steam injected for this purpose is sufficient to reduce the PSA content of the solution at least by half, or even by two thirds, (e.g. to a value close to 4% by weight in the case of the medium (I)), after which the phase inversion is brought about (preferably both by injection of liquid water and additional steam) in order to definitively precipitate the polymer, preferably with vigorous stirring (see above).

In these 2 preferred variants, the pre-precipitation therefore takes place during the injection of steam to remove at least some of the PSA, whereas the final precipitation (phase inversion) takes place by injecting water both in liquid and in vapour form. These variants therefore comprise, in order, the following steps:
  addition of liquid water (or, more generally: of aqueous phase—see above) to the starting solution in an amount that is insufficient to bring about the pre-precipitation of the polymer;
  addition of steam in an amount that is sufficient in order to pre-precipitate the polymer without giving rise to the phase inversion and in order to at least partially evaporate the PSA; and
  addition of steam and liquid water in order to give rise to the phase inversion and definitively precipitate the polymer.

The pre-precipitation may be observed visually, by the appearance of a haze linked to the presence of the polymer grains being formed, or by any suitable measurement (e.g. a turbidity measurement).

In the case where the process according to the invention is a process for recycling a polymer by dissolution/precipitation that operates in batch mode and in a loop (i.e. with recovery of the vapours, condensation of the latter and reuse of the (organic and aqueous) phases after settling using PSA), the second variant (with partial removal of the PSA) however has, as an additional advantage, a greater flexibility of the process.

This is because it is no longer necessary to have a water/solvent azeotropic composition that is "pure" (free of PSA) in order to be able to completely strip the PSA. Therefore, it is possible to operate several batches in parallel (which is advantageous because, since the dissolution step is faster than the precipitation, it is possible to use only a single dissolution reactor with several precipitation reactors operating in parallel and sequentially) and to feed all the vapours resulting from the various precipitation reactors to a single settling tank. This tank may then be used as a solvent (organic phase) and water (aqueous phase) reserve.

Therefore, the present invention also relates to a process for recycling a polymer comprising the following steps:
  dissolving the polymer in a liquid medium comprising in particular a PAOS, a PSA and an alcohol as defined above;
  recovering the polymer using a process as defined above;
  condensing the vapours that result from this process in order to obtain a liquid;
  settling of the liquid so as to obtain an organic phase comprising the PSA, a major fraction of the PAOS and alcohol and a minor fraction of water, and an aqueous phase comprising a major fraction of water and minor fractions of PAOS and alcohol; and
  optionally, repeating the preceding steps in a loop using at least one part of the organic phase as the dissolving liquid medium.

In this process, when the polymer is PVC, the composition of the organic phase is preferably the composition (I) described above. As regards the composition of the aqueous phase in settling equilibrium with this organic phase, it is preferably the following: water/propanol/MEK in the following weight proportions: 80.5/2/17.5.

According to one advantageous variant, some of the aqueous phase is also withdrawn and used in order to approach the phase inversion as explained above. And according to one particularly advantageous variant already mentioned above, the final precipitation (phase inversion) is preferably brought about by using water both in liquid form and in vapour form, preferably with vigorous stirring. Generally, this water is water recovered at the end of the preceding batch (in particular: it may be water from which the PVC particles have been recovered after the final stripping).

In this variant, it is advantageous to drive the various batches (repetition of the steps described above) so that the volume and the composition of the liquid medium in the tank are substantially constant so as to be able to put the process into operation. One way of proceeding that gives good results in practice consists in withdrawing at least some of the aqueous phase in order to approach the phase inversion as explained above; in using steam and extra water to give rise to the phase inversion and then, to drive the stripping and azeotropic distillations to completion in order to obtain well-formed polymer particles suspended in a medium that is mainly composed of water; and in separating these particles from the water. Preferably, at least some of this water is stored in order to be able to use it to give rise to the phase inversion of the batch (the next batch, see above) and the surplus (where appropriate) is removed from the loop.

The particles can be recovered (separated from water after the final stripping) by any conventional means for separating a solid from a fluid, such as settling, centrifuging (spinning), filtering, etc.

In such a process, the dissolution is generally carried out under a pressure that is at least equal to atmospheric pressure, or even at least equal to 1.5 bar. Advantageously, this pressure does not exceed 10 bar, preferably 5 bar. Given that the precipitation generally takes place at a pressure that is at the very most atmospheric pressure (see above), it is generally advantageous to reduce the pressure of the solution (i.e. to subject it to a "flash" evaporation) before precipitation.

In such a process, the dissolution temperature is generally at least 85° C., or even 110° C.; it does not generally exceed 125° C., or even 115° C. It may also prove to be advantageous to work under an inert atmosphere, for example under nitrogen, to avoid any risk of explosion and degradation of the solvent, of the non-solvent and/or of the phase separation agent.

The present invention is illustrated in a non-limiting manner by Examples 1 and 2. In each of these, several tests were carried out in a loop (with condensation of the vapours generated, settling in a tank and reuse of the organic (solvent) and inorganic (aqueous) phases obtained after introducing increasing amounts of isopropanol (see the figures)), starting from a solvent comprising (by weight) 15% isohexane, 5% water and 80% MEK. When this isopropanol was being introduced, an amount of PSA (isohexane) was added in order to maintain the PSA concentration at the value of 15%.

In each of these tests, 45 kg of PVC derived from cable scrap (FC001=standard grade; FC005: over-plasticized grade; these grades had a composition that varied around an average of approximately 50% PVC resin, 25% plasticizer and 25% filler, the FC005 grade on average containing a little more plasticizer, namely 27 to 30%) were dissolved in 180 kg of solvent as described above.

The dissolution was carried out at 100° C. and under 3 bar.

The solution thus obtained was filtered and subjected to a flash evaporation up to 1 bar. Introduced thereinto were 65 kg of the aqueous phase in equilibrium with the organic phase in the settling tank.

A run (series of tests) was carried out for each grade of PVC in each of the examples.

EXAMPLE 1

Introduced into the solution were 65 kg of aqueous phase and of the water/MEK azeotrope (weight ratio: 11/89) in liquid form and in vapour form in a ratio (225 kg/h)/(70 kg/h) until the isohexane had completely evaporated (which was ensured by stabilizing the temperature (at constant pressure) to that of the boiling point of the azeotrope).

Introduced next were precipitation water (45 liters) and steam (at a flow rate of 120 kg/h) in a sufficient amount to bring about the phase inversion of the medium and the injection of steam was continued until the precipitation medium reached 100° C.

Recovered were, on the one hand, PVC particles, the BD and particle size (average diameter) of which were measured and, on the other hand, the vapours generated, which were condensed in order to be able to carry out the next test. The tests carried out with a dissolution solvent containing 0 and 1% isopropanol were carried out under vacuum (0.6 bar) and with the primary dispersant (72.5% hydrolysed polyvinyl alcohol introduced with the aqueous phase) and secondary dispersant (40% hydrolysed polyvinyl alcohol introduced after the secondary water). The other tests were carried out at atmospheric pressure without dispersant.

EXAMPLE 2

Introduced into the solution were 65 kg of aqueous phase and of steam in a sufficient amount to observe the pre-precipitation of the PVC.

Introduced next were precipitation water (105 liters) and steam (at a flow rate of 120 kg/h) in a sufficient amount to bring about the phase inversion of the medium and the injection of steam was continued until the precipitation medium reached 100° C.

Recovered were, on the one hand, PVC particles, the BD and particle size (average diameter) of which were measured and, on the other hand, the vapours generated, which were condensed in order to be able to carry out the next test.

Figure 1:
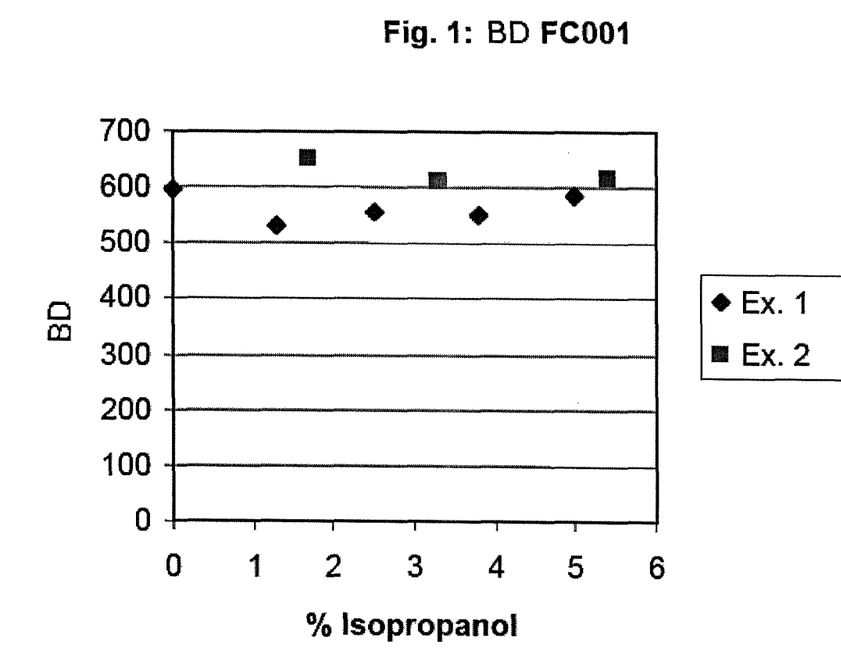
Figure 2:
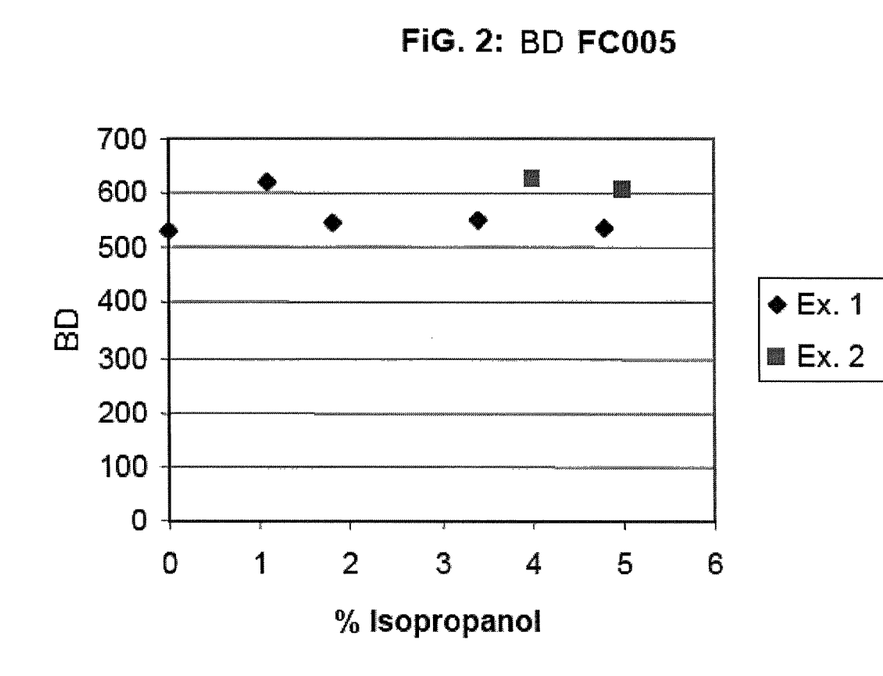
Figure 3:
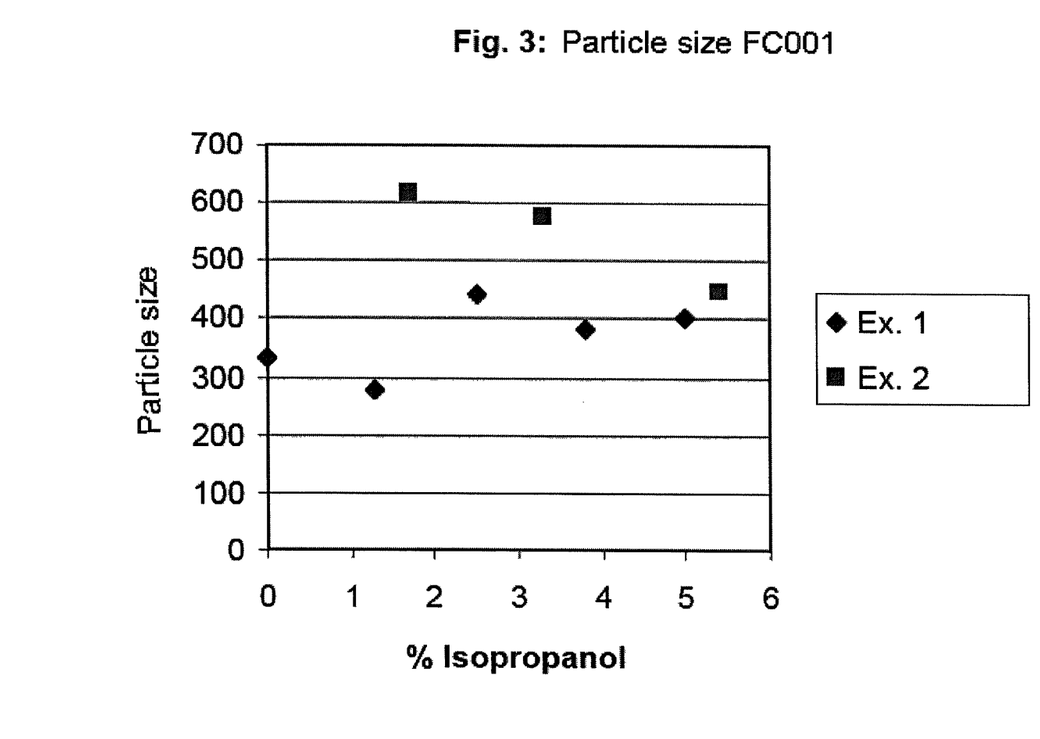
Figure 4:
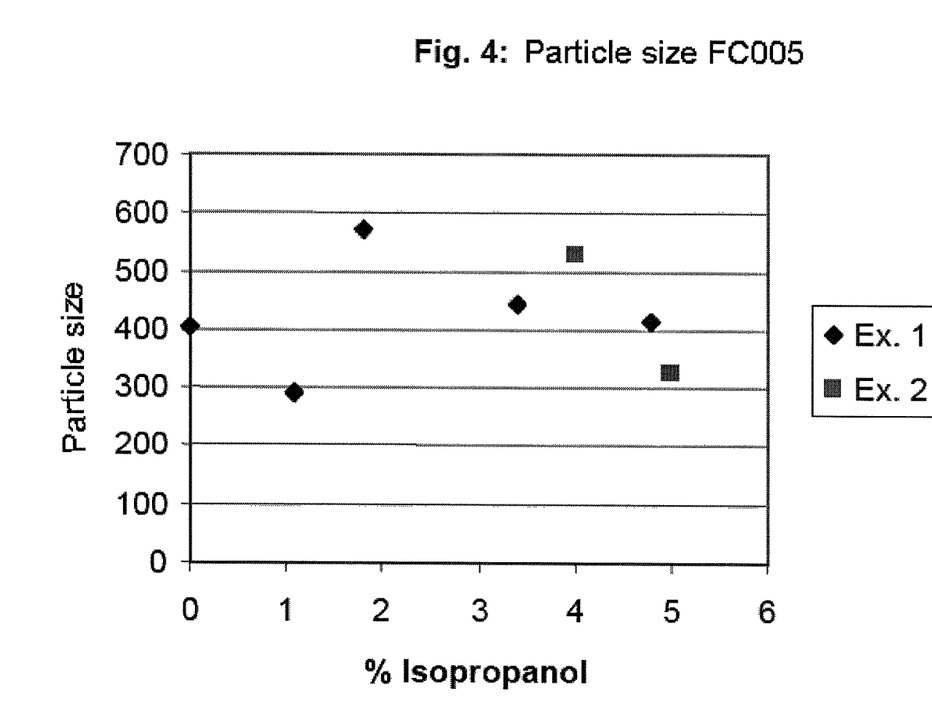

FIGS. 1 to 4 graphically illustrate the results obtained respectively for the BD and particle size measurements.

It can be seen therein that effectively, at least starting from 1.5% by weight of isohexane, working under vacuum and in the presence of dispersants is unnecessary.

Qualitatively, it is observed that the presence of isopropanol reduces the appearance of deposits of material (commonly known as "crusting") on the walls of the precipitation reactor.

The invention claimed is:

1. A process for recovering a polymer, comprising injecting steam, and optionally liquid water, into a polymer solution, said polymer solution comprising:
    said polymer, a C2-C6 linear aliphatic alcohol, a polar aprotic organic solvent (PAOS) that has an azeotrope with water, and an apolar organic compound that is miscible with the PAOS and immiscible with water and that acts as a phase separation agent (PSA), the boiling point of which is below that of the water/PAOS azeotrope,
    wherein the amount of steam injected into said solution is sufficient to give rise to the substantial removal of the PSA via stripping and of the PAOS via azeotropic distillation, and the total amount of water added to said solution from said steam and optional liquid water is sufficient to give rise to the precipitation of the polymer via phase inversion, and wherein the polymer solution consists of an organic phase in which an aqueous phase is optionally dispersed; the process is conducted such that a liquid aqueous phase is added to the organic phase in an amount that is insufficient to give rise to phase inversion; and said steam is injected into the liquid medium thus obtained so that at least one part of the PSA is removed therefrom before phase inversion in an amount such that the C2-C6 linear aliphatic alcohol makes the organic phase more hydrophilic during the phase inversion that gives rise to the precipitation of the polymer.

2. The process according to claim 1, wherein the polymer is chosen from homopolymers of vinyl chloride (PVC), copolymers of vinyl chloride, and polymers that have a solubility parameter close to that of PVC.

3. The process according to claim 2, wherein the PAOS is MEK (methyl ethyl ketone) or DEK (diethyl ketone).

4. The process according to claim 3, wherein the PSA is isohexane.

5. The process according to claim 4, wherein the alcohol is a C3-C5 linear aliphatic alcohol.

6. The process according to claim 5, wherein the alcohol is isopropanol.

7. The process according to claim 1, wherein the phase inversion is caused by addition of steam and liquid water.

8. A process for recycling a polymer comprising:
dissolving a polymer in a liquid medium comprising a polar aprotic organic solvent (PAOS), a phase separation agent (PSA) and a C2-C6 linear aliphatic alcohol;
recovering the polymer using the process according to claim 1;
condensing the vapors that result from this process in order to obtain a liquid;
settling of the liquid so as to obtain an organic phase comprising the PSA, a major fraction of the PAOS and alcohol and a minor fraction of water, and to obtain an aqueous phase comprising a major fraction of water and minor fractions of PAOS and alcohol; and
optionally, repeating the preceding steps in a loop using at least one part of the organic phase as the dissolving liquid medium.

9. The process according to claim 8, wherein the polymer is a homopolymer of vinyl chloride (PVC), and the organic phase comprises between 2% and 8% by weight of C2-C6 linear aliphatic alcohol, between 13% and 17% of PSA and between 4% and 6% of water, the remainder being composed of PAOS.

10. The process according to claim 9, wherein the alcohol is isopropanol, the PSA is isohexane, and the PAOS is methyl ethyl ketone (MEK).

11. The process according to claim 8, wherein at least some of the aqueous phase is withdrawn and is added to the polymer solution in an amount that is insufficient to give rise to a pre-precipitation of the polymer; wherein steam and extra water are used to give rise to a phase inversion; wherein the stripping and azeotropic distillations are driven to completion in order to obtain well-formed polymer particles suspended in a medium that is mainly composed of water; and wherein these particles are separated from the water.

12. The process according to claim 1, wherein the alcohol is a C3-C5 linear aliphatic alcohol.

13. The process according to claim 12, wherein the alcohol is isopropanol.

14. The process according to claim 1, comprising injecting steam and liquid water into said solution.

15. The process according to claim 1, wherein the polymer is PVC, and wherein the polymer solution comprises said PVC, 2%-8% by weight of said alcohol, 13%-17% by weight of said PSA, 4%-6% by weight of water, and 69%-79% by weight of said PAOS.

16. The process according to claim 15, wherein the polymer solution comprises said PVC, 3%-4.5% by weight of isopropanol, 13%-17% by weight of isohexane, 4%-6% by weight of water, and 69%-79% by weight of MEK.

* * * * *